United States Patent [19]
Kruse

[11] Patent Number: 5,942,106
[45] Date of Patent: Aug. 24, 1999

[54] FILLER BODY AND METHOD FOR ITS MANUFACTURE

[75] Inventor: Hans-Dieter Kruse, Stadland, Germany

[73] Assignee: Norddeutsche Seekabelwerke Aktiengesellschaft, Germany

[21] Appl. No.: 08/574,129

[22] Filed: Dec. 18, 1995

[30] Foreign Application Priority Data

Dec. 19, 1994 [DE] Germany .................. 94 20 207 U

[51] Int. Cl.⁶ ........................................... C02F 3/10
[52] U.S. Cl. ................................. 210/150; 210/615
[58] Field of Search ................................. 210/150, 151, 210/615; 261/94, 112.1

[56] References Cited

U.S. PATENT DOCUMENTS

| | | | |
|---|---|---|---|
| 2,590,964 | 4/1952 | Halvorson | 210/615 |
| 3,227,429 | 1/1966 | Renet | 210/150 |
| 3,232,865 | 2/1966 | Quinn et al. | 210/615 |
| 3,329,271 | 7/1967 | Ward et al. | |
| 3,347,381 | 10/1967 | Minch et al. | 210/150 |
| 3,589,518 | 6/1971 | Brebion | 210/150 |
| 4,477,394 | 10/1984 | Armstrong et al. | 261/112.1 |
| 4,929,349 | 5/1990 | Beckman | 210/151 |
| 5,225,116 | 7/1993 | Menzel et al. | 261/94 |
| 5,326,503 | 7/1994 | Iwashita et al. | 261/112.1 |
| 5,388,316 | 2/1995 | MacLaren | |
| 5,693,383 | 12/1997 | Basse et al. | 261/94 |

FOREIGN PATENT DOCUMENTS

| | | |
|---|---|---|
| 0010045 | 4/1980 | European Pat. Off. |
| 3522241 | 1/1987 | Germany |
| 9317576 | 2/1994 | Germany |
| 4320469 | 12/1994 | Germany |
| 53-139354 | 5/1978 | Japan |

*Primary Examiner*—Christopher Upton
*Attorney, Agent, or Firm*—Rothwell, Figg, Ernst & Kurz, p.c.

[57] ABSTRACT

Filler bodies for the biological purification of, for example, waste water are fitted together from individual filler-body blocks. In this case, these have to be releaseably connected to one another. In known filler bodies, adapters are used for this purpose which obstruct the ability of the waste water to flow through or around the filler body. As a result, the cleaning capacity is also reduced.

The filler body according to the invention has at least one tube of one or each filler-body block (21, 22, 23, 36, 40, 45) as a tube (31, 37, 38, 39, 56) which extends over a plurality of filler-body blocks (21, 22, 23, 36, 40, 45). As a result, the individual filler-body blocks (21, 22, 23, 36, 40, 45) are connected to one another in a positive-locking manner without the ability to flow through or around the filler body being obstructed.

The filler body according to the invention is particularly suitable as a substrate for a so-called biological lawn for the biological purification of waste water or gases.

16 Claims, 7 Drawing Sheets

5,942,106

FILLER BODY AND METHOD FOR ITS MANUFACTURE

The invention relates to a filler body, in particular for biological purification of waste water, according to the preamble of claim 1. Furthermore, the invention relates to a method for the manufacture of the filler body according to the preamble of claim 21.

Filler bodies of the type mentioned here are mainly used wherever the transfer of substance between gases and/or liquids is to be improved. These types of filler bodies have proved to be particularly expedient in the sector of biological purification of waste water where they are used as trickling filters or as an immersed packed bed. In this case, the filler body serves as a substrate for the bacteria required for the biological treatment, namely a so-called biological lawn. The capacity of a system, fitted with filler bodies of this type, for example for purifying waste water depends on a plurality of factors. On the one hand, the filler body is intended to provide a specific growth area which is as large as possible; on the other hand, the best possible support for the bacteria on the filler body is required. Finally, flow through or around the filler body by the liquid to be treated is to be as unimpeded a manner as possible. For this purpose, a precise vertical and horizontal alignment of the individual filler-body blocks of the filler body is required.

The German Utility Model 93 17 576 shows a filler body for the purification of waste water, whose filler-body blocks are releaseably connected with the aid of an adapter. At the same time, the adapter serves for the precise alignment of the individual filler-body blocks. The known adapter has a continuously closed outer surface. Furthermore, this adapter has an outside diameter which is smaller than the inside diameter of the individual tubes of the filler-body blocks. For the connection and precise alignment of two filler-body blocks, at least one adapter is inserted into adjacent ends of two tubes. This has the disadvantage that the cross-sections of the respective tubes are narrowed and the liquid to be treated thus can no longer flow through or around the filler bodies in an unimpeded manner. The adapter therefore reduces the efficiency of a filler body of this type.

Starting from this prior art, the present invention is based on the problem of providing an efficient filler body.

To solve this problem, the filler body according to the invention has the features of claim 1. This has the advantage that, with the aid of the preferably loose tubes (which, however, may also be connected retrospectively to other tubes of the filler-body blocks), a precise alignment of the filler-body blocks is possible in that these tubes extend over a plurality of filler-body blocks. The inside diameter of the tubes is not narrowed by an adapter. The liquid to be treated can thus flow through or around the biological lawn in an unimpeded manner. A system, fitted with a filler body of this type, for the biological purification of waste water thus has a high efficiency.

The tubes and loose tubes preferably have the same dimensions. This has the advantage that no new or additional components have to be manufactured. A filler body of this type can be produced with high cost-effectiveness.

The method according to the invention for the manufacture of the filler body is characterized by the features of claim 21. The filler-body blocks are firstly manufactured completely in the usual manner. Subsequently, the loose tubes are separated and removed from the filler-body block at the appropriate points. As a result, both the filler-body block with the gaps and the corresponding loose tubes are manufactured in only two operating steps, the gaps being automatically matched to the cross-section of the loose tubes.

Preferred further developments of the invention emerge from the subclaims and the description. Exemplary embodiments of the invention are explained in greater detail below with reference to the drawing, in which:

Figure 1:
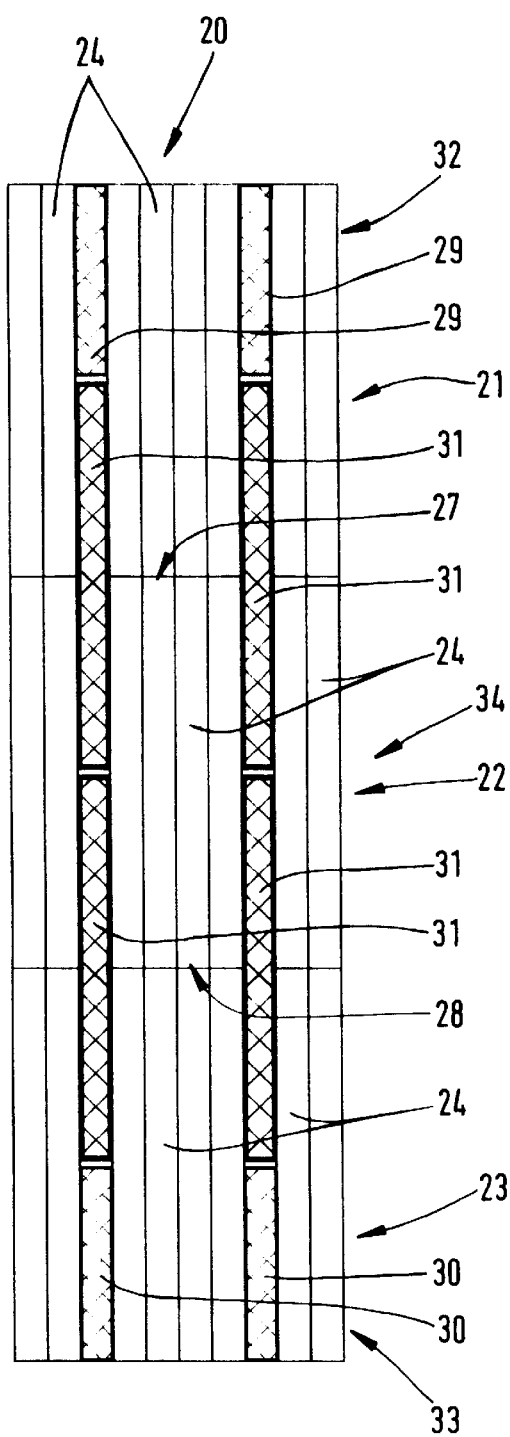
FIG. 1 shows a filler body according to a first exemplary embodiment of the invention in a diagrammatic cross-section.

The filler bodies shown here are trickling filters and an immersed packed bed, as are used for the biological treatment of liquids. For this purpose, filler bodies of this type are inserted into a trickling filter and the liquid to be treated is sprayed onto them, or they are immersed into a basin filled with the liquid to be treated.

A filler-body consists of a plurality of filler-body blocks arranged adjacently and/or one above the other. The filler-body blocks arranged one above the other are releaseably connected to one another. The filler-bodies 20 according to FIG. 1 consist of a plurality of filler-body blocks 21, 22, 23 arranged vertically one above the other. The filler-body blocks 21, 22, 23 consist of a plurality of tubes 24 connected to one another. The tubes 24 of the filler-body blocks 21, 22, 23 have an outer surface structured in a net-like manner. Furthermore, the tubes 24 are firmly connected to one another, e.g. by welding.

The filler-body blocks 21, 22, 23 have gaps 25, 26. In the exemplary embodiments shown here, each filler-body block 21, 22, 23 has two gaps 25, 26.

Depending on the design of the gaps 25, 26, two types of filler-body blocks 21, 22, 23 can be differentiated. In a first type of filler-body blocks 22, the gaps 25 in the filler-body block 22 extend over its entire height. Channels which penetrate the entire filler-body block 22 thus result. In the second type of filler-body blocks 21, 23, the gaps 26 in the filler-body blocks 21, 23 extend solely over a part of the height thereof. In this case, the gaps 26 are assigned to the filler-body blocks 21, 23 in such a way that they extend, starting from one side face 27, 28 of the filler-body block 21, 23, into the interior of the filler-body block 21, 23. In this case, the gaps 26 extend approximately over half the height of the filler-body blocks 21, 23. The gaps 26 are bounded by tubes 29, 30 which are designed to correspond to the tubes 24, but have a shorter length dimension. The tubes 29, 30 are firmly connected to the tubes 24 of the filler-body blocks 21, 23 by welding.

For the precise vertical and horizontal alignment of the filler-body blocks 21, 22, 23, loose tubes 31 extend over a plurality of filler-body blocks 21, 22 and 22, 23. The loose tubes 31 correspond precisely to the tubes 24 of the filler-body blocks 21, 22, 23, specifically in respect of their shape and their dimensions. The loose tubes 31 project into the correspondingly dimensioned gaps 25, 26 in the filler-body blocks 21, 22, 23 and provide a releaseable connection of the filler-body blocks 21, 22, 23. Unintentional horizontal displacement of the filler-body blocks 21, 22, 23 is avoided due to the loose tubes 31, and the precise alignment of the filler-body blocks 21, 22, 23 is thus guaranteed. After the connection of the filler-body blocks 21, 22, 23, the loose tubes 31 can be connected to particular tubes 24.

The filler-body blocks 21, 23 with the gaps 26 extending solely over a part of the height of the filler-body blocks 21, 23 are assigned to lateral ends 32, 33 of the filler-body. Filler-body blocks 22 with continuous gaps 25 are correspondingly assigned to a central region 34 of the filler body 20. In this case, the filler-body blocks 21, 23 are arranged in such a way that the gaps 26 in the filler-body blocks 21, 23 continue the gaps 25 in the filler-body block 22 (FIG. 1). Consequently, the tubes 29, 30 close the gaps 26 towards the ends 32, 33 of the filler-body 20. It is obvious that, differing from the exemplary embodiment shown in FIG. 1, any desired number of filler-body blocks 22 with continuous gaps 25 can be arranged between the lateral filler-body blocks 21, 23.

Figure 3:
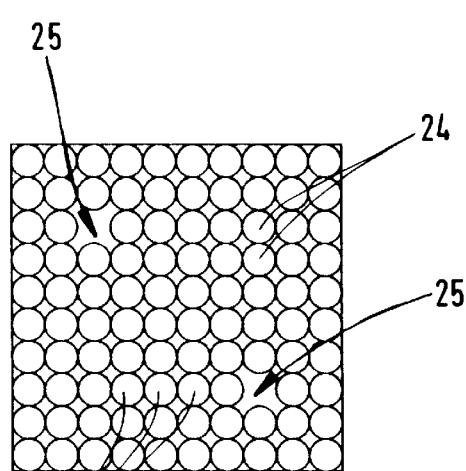
FIG. 3 shows a second filler-body block in a view similar to that of FIG. 2.
Figure 4:
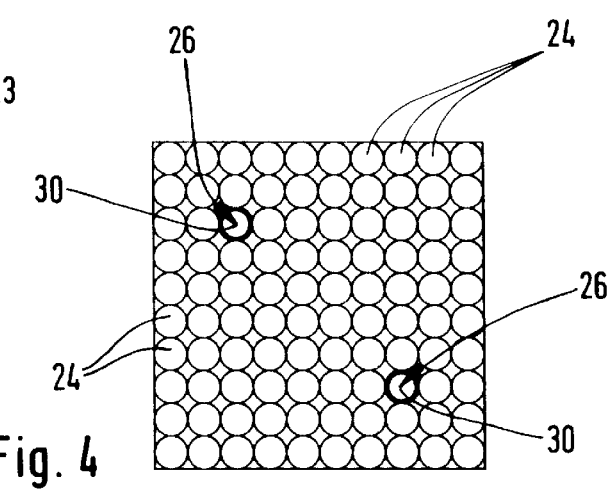
FIG. 4 shows a further filler-body block in a view similar to those of FIGS. 2 and 3.
Figure 5:
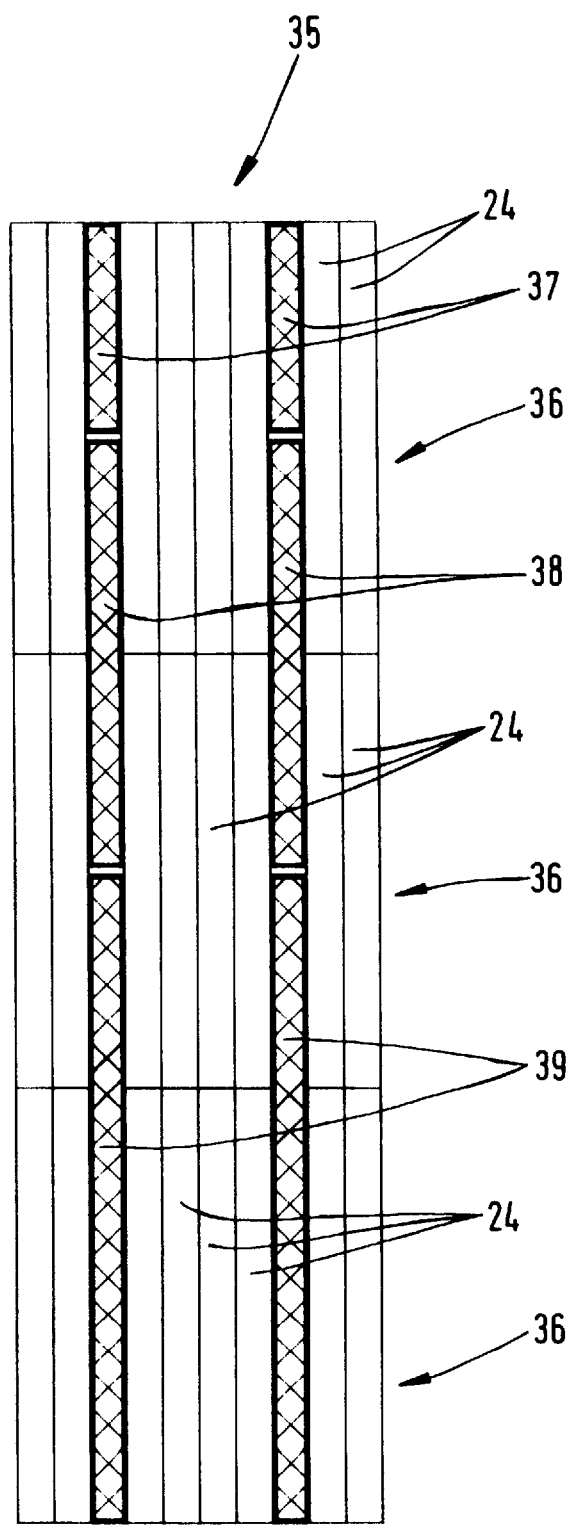
FIG. 5 shows a filler body according to a second exemplary embodiment of the invention in a view similar to that of FIG. 1.

FIG. 5 shows a second design of a filler body 35 according to the invention. The filler body 35 consists of three identical filler-body blocks 36 which are designed in a similar way to the filler-body block 22 according to FIG. 3. The filler-body blocks 36 consequently have continuous gaps 25 which extend over the entire height of the filler-body blocks 36. Since the filler-body block 36 and the filler-body block 22 are designed in the same manner, the same reference numerals are used for the same parts.

The gaps 25 in the filler-body blocks 36 receive loose tubes 37, 38, 39 for the precise alignment of the filler-body blocks 36. The loose tubes 37, 38, 39 correspond, apart from in the length dimensions, precisely to the tubes 24 of the filler-body blocks 36. The length dimensions of the loose tubes 37, 38, 39 correspond approximately to ½, 2/2, 3/2 times the height of the filler-body blocks 36 or the length dimension of the tubes 24. However, it is also conceivable to use loose tubes which are only approximately half as long or equal to the length dimension of the tubes 24. According to FIG. 5, some of the loose tubes 38, 39 extend over a plurality of filler-body blocks 36. The loose tubes 37 solely close the gaps 25 of the uppermost filler-body block 36 towards the top. Any unintentional horizontal displacement of the filler-body blocks 36 is also avoided with this filler body 35 designed according to the invention. The filler-body blocks 36 always remain precisely aligned.

In order to obtain a filler body which is as inherently stable as possible from the individual filler-body blocks 21, 22, 23 and 36, it is expedient to place the latter one on top of another joined together in layers. This purpose is served by a filler-body block 40, as is shown in greater detail in FIG. 6. This filler-body block 40 has four continuous gaps 41. In this case, the gaps 41 are arranged in such a way that two gaps 41 are arranged within one row 42 or one column 43. In this case, the distance between two gaps 41 in one row 42 or one column 43 is precisely double the distance of one gap 41 from an outer edge 44 of the filler-body block 40. In the present case, four rows or columns of tubes 24 are arranged between two gaps 41. Correspondingly, there are two rows or columns of tubes 24 between the gaps 41 and the edges 44 of the filler-body block 40.

Figure 2:
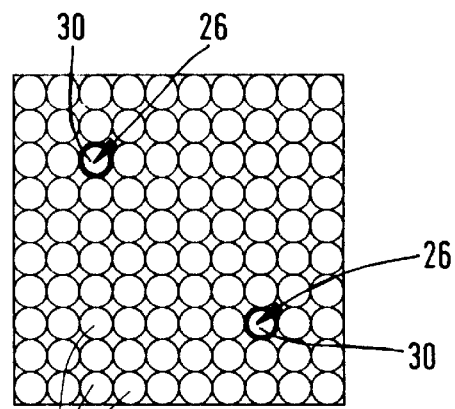
FIG. 2 shows a filler-body block in a plan view.
Figure 6:
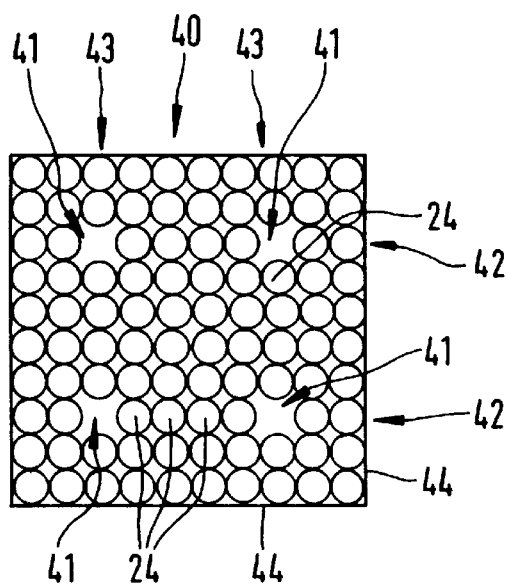
FIG. 6 shows a filler-body block similar to that of FIG. 3 in a modified form in a plan view.
Figure 7:
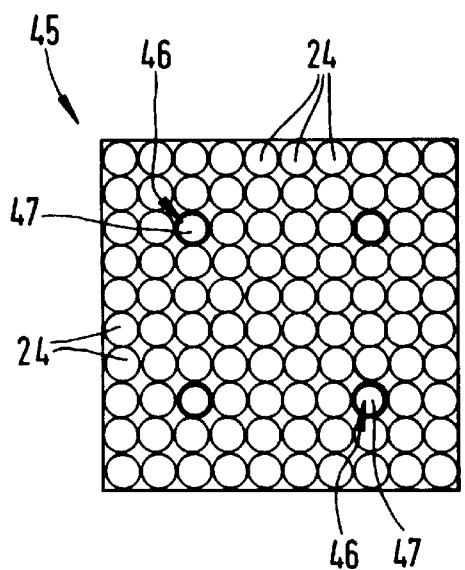
FIG. 7 shows a filler-body block similar to that of FIG. 2 in a modified form in a plan view.

A filler-body block 45 which essentially corresponds to the filler-body block 40 according to FIG. 6 is illustrated in FIG. 7. However, similar to the filler-body block according to FIG. 2, this filler-body block 45 only has gaps 46 which extend only over a part of the height of the filler-body block 45. The filler-body block 45 thus still has tubes 47 which are designed to correspond to the tubes 24, but have a shorter length dimension. The tubes 47 are firmly connected to the tubes 24, e.g. by welding.

Figure 8:
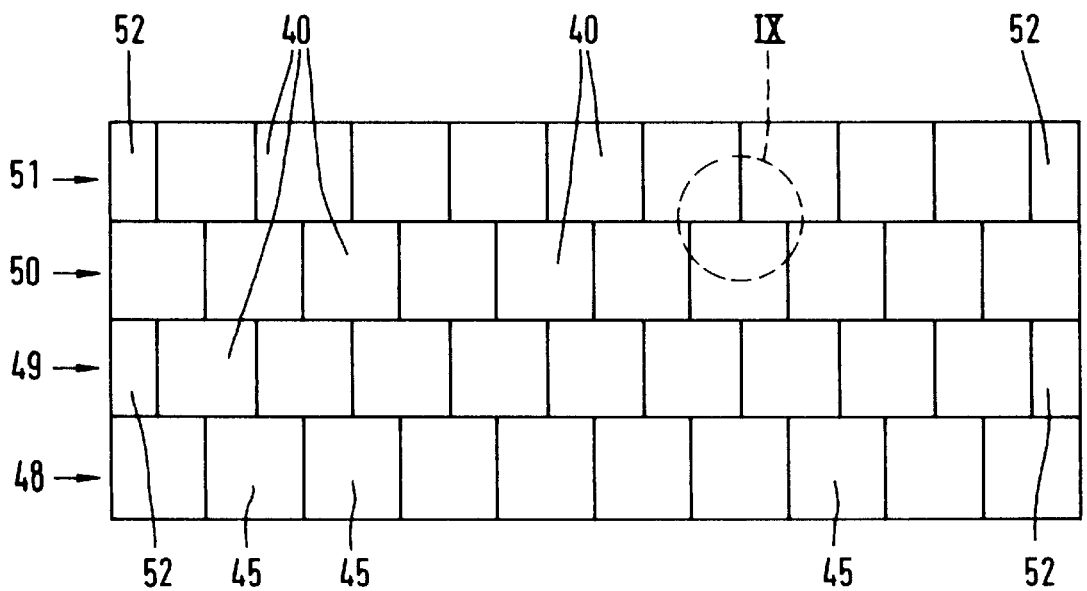
FIG. 8 shows a filler body according to a third exemplary embodiment in a diagrammatic side view.

A filler body which is formed from a combination of filler-body blocks 40 and/or 45 is shown in greater detail in FIG. 8. Since the filler-body blocks 45 only have gaps 46 which extend over a part of the height of the filler-body block 45, these preferably serve as the lowest layer 48 of the filler body. The layers 49, 50, 51 located above it can be formed from filler-body blocks 40. However, the uppermost layer 51 can also be formed from filler-body blocks 45 which have been turned with the topside downwards.

Figure 9:
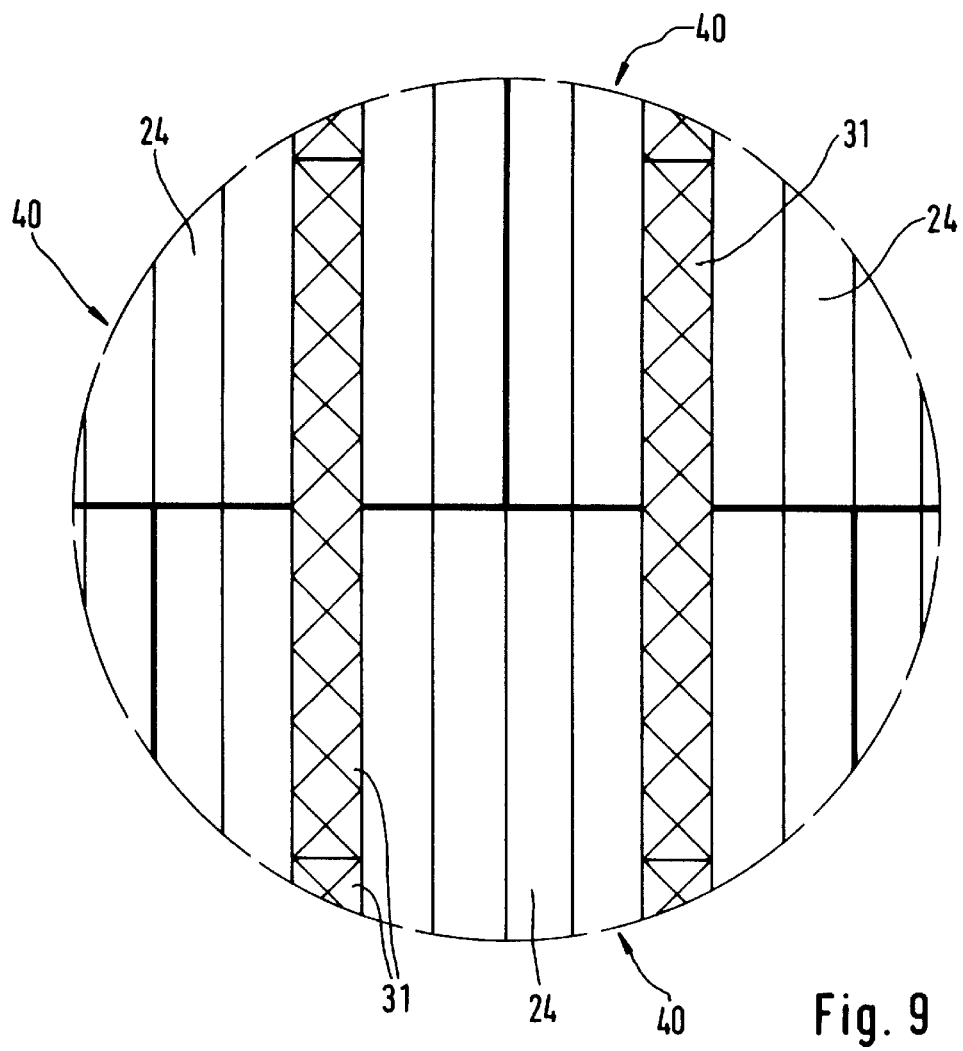
FIG. 9 shows a view of a detail of the filler body according to FIG. 8.

As emerges directly from FIG. 8, the filler-body blocks 40, 45 of one layer 48 . . . 51 are each displaced by half the width or length of a filler-body block 40, 45 of a layer 48 . . . 51 located above it or below it. As emerges, in particular, in greater detail from FIG. 9, the individual filler-body blocks 40, 45 are in this case aligned relative to one another in such a way that the gaps 41, 46 are flush with one another. The loose tubes 31 are inserted into these gaps 41, 46. The filler-body blocks 40, 45 are thus connected to one another in a positive-locking manner by the loose tubes 31. A stable filler body thus results due to this combined arrangement of the filler-body blocks 40, 45.

Figure 10:
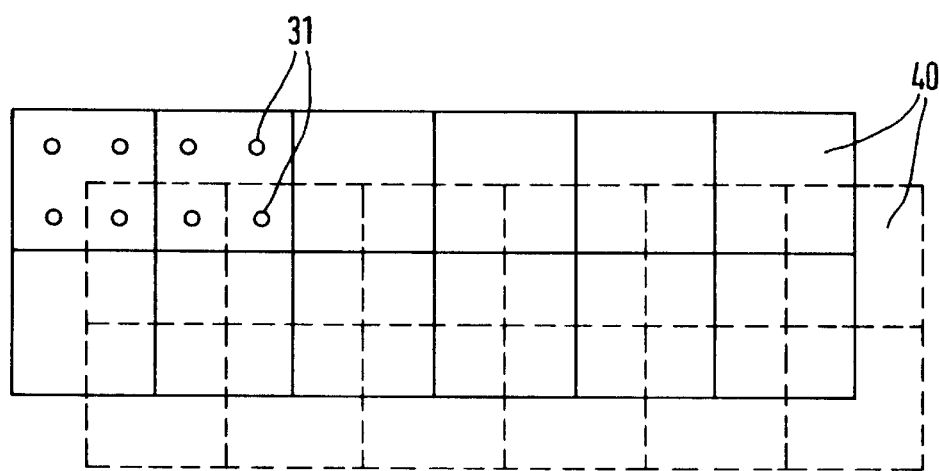
FIG. 10 shows a filler body according to a further exemplary embodiment of the invention in a diagrammatic plan view.

As is shown in greater detail in FIG. 10, a combination can be produced with the filler-body blocks 40, 45, in which the filler-body blocks 40, 45 are offset relative to one another from layer to layer in both horizontal directions. One filler-body block 40, 45 respectively covers only ¼ of the area of a filler-body block 40, 45 located above it or below it (seen in a plan view). A filler body which is dimensionally stable in any direction thus results.

To form the "combined" filler bodies described above, filler-body blocks of smaller dimensions, seen in a plan view, are also required. For this purpose, semi-filler-body blocks 52 (FIG. 8) and quarter-filler-body blocks (not illustrated) are manufactured. These can be manufactured by separating filler body blocks 40, 45 between the corresponding rows 42 or columns 43 of tubes 24.

Figure 11:
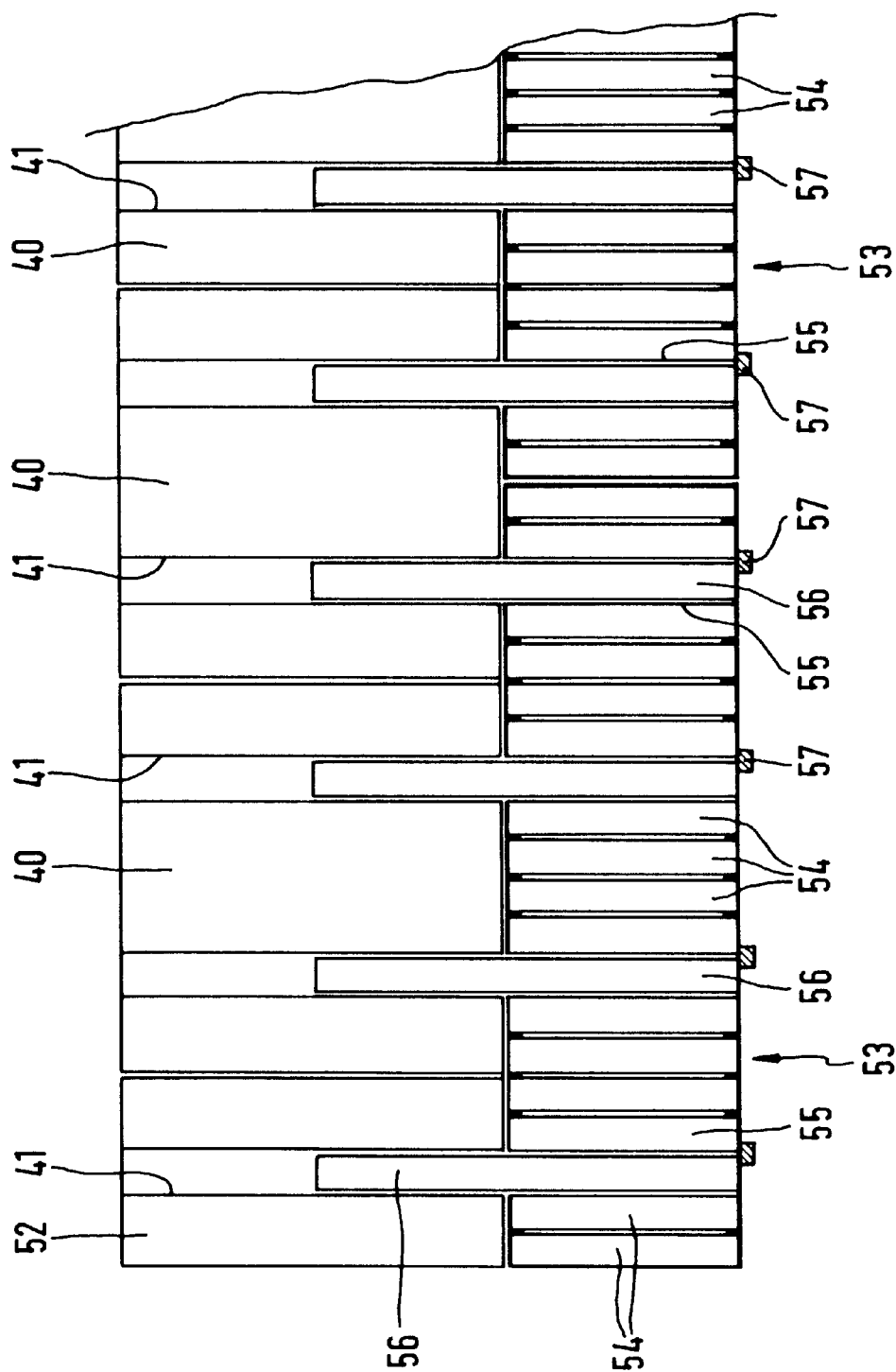
FIG. 11 shows a bearing for the filler bodies according to the invention in a diagrammatic side view.

A bearing for the filler bodies according to the invention is shown in greater detail in FIG. 11. The bearing has to be designed in such a way that the flow of the liquid to be cleaned through and around the filler body is impeded as little as possible. Bearing blocks 53 are provided for this purpose, which in turn are manufactured from individual tubes 54. In this case, the tubes 54 are welded to one another in the region of their end faces. The tubes 54 correspond precisely in respect of their cross-sectional dimensions to the tubes 24 for forming the filler-body blocks 40, 45.

The bearing blocks 54 are designed in respect of their dimensions in the horizontal plane to be larger than the filler-body blocks 40, 45. Whereas the filler-body blocks 40, 45 are manufactured from 10×10 tubes 24, the bearing blocks 53 are manufactured from 20×20 tubes 54. The bearing blocks 54 likewise have gaps 55 which extend over a part of the height of the bearing block 53 or, as in the exemplary embodiment shown, over the full height of the bearing block 53. In this case, the bearing blocks 53 and the filler-body blocks 40 are aligned relative to one another in such a way that the gaps 41 in the filler-body blocks 40 are flush with the gaps 55 in the bearing blocks 53. Loose tubes 56 are again inserted into the gaps 41 and 55 to produce a positive-locking connection. The loose tubes are designed to be longer than the tubes 54 of the bearing block 53. In the present case, the loose tubes 56 extend from the lower edge of the bearing blocks 53 up to half the height of the filler-body blocks 40 located above it.

The bearing blocks 53 in turn rest on a grate of rods 57. In this case, the bearing blocks 53 are designed such that it is sufficient to support only every third, fourth or fifth row of tubes 54. In the exemplary embodiment shown, the bearing blocks 53 are designed such that the rods 57 each extend in the region of the loose tubes 56. In this case, the rods 57 are arranged in such a way that they extend with a part of their width in the region of the loose tubes 56 and with the other part of their width in the region of the tubes 54. As a result, at the same time, the loose tubes 56 are secured against dropping out, such that they do not have to be connected in a separate manner to the tubes 54 of the bearing blocks 53. However, it is also possible to connect the loose tubes 56 firmly to the tubes 54 of the bearing blocks 53 and/or to the tubes 24 of the filler-body blocks 40, e.g. by welding.

Since the filler-body blocks 40 can float, e.g. during the purification of waste water, a buoyancy safeguard is also to be provided. This can be effected, on the one hand, by placing a layer of bearing blocks on the filler body, which are designed in terms of their weight so that the filler-body blocks 40 cannot float.

Figure 12:
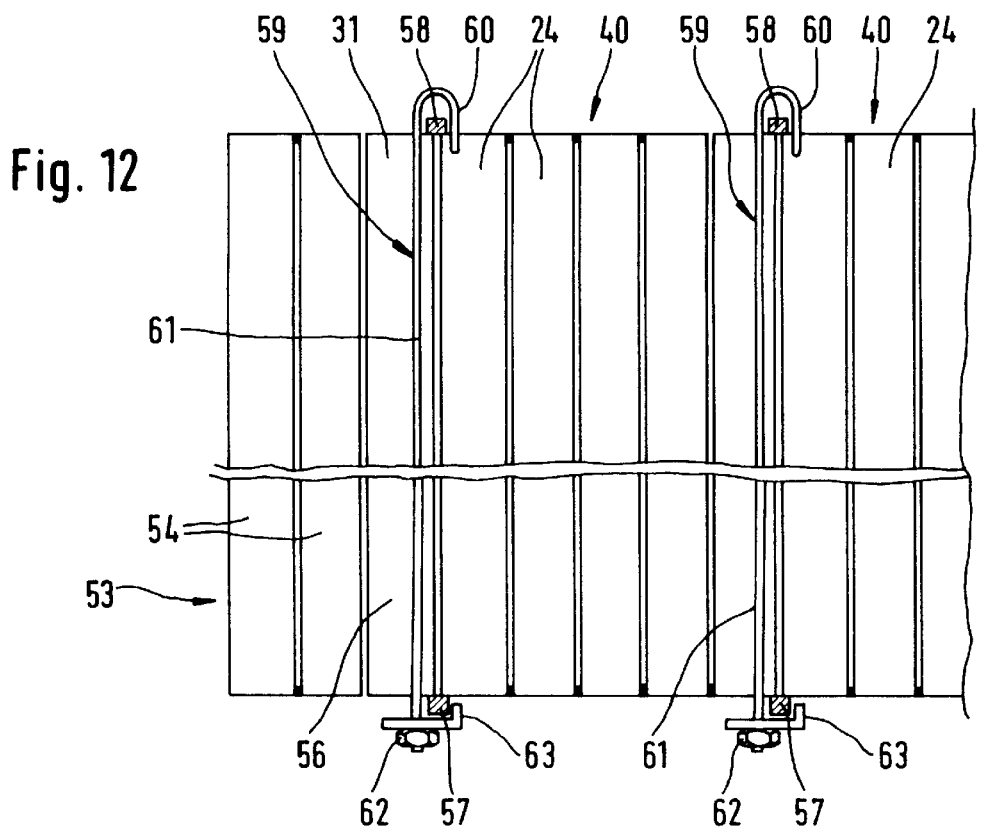
FIG. 12 shows a buoyancy safeguard for the filler bodies according to the invention in a side view.

Another type of buoyancy safeguard is shown in greater detail in FIG. 12. In this case, a grate of rods 58 is placed on the uppermost layer of the filler-body blocks 40. The rods 58 are connected by a toggle 59 to the rods 57. In respect of its length, the toggle 59 is designed to be slightly longer than the overall height of the filler body and the layer of bearing blocks 53. This is necessary in order to compensate different thermal expansions of the different materials. At its upper end, the toggle 59 has a hook 60 formed by bending round. The hook is designed in such a way that, with its free end, it surrounds the rod 58 and still projects slightly into a tube 24 of the filler-body block 40. A limb 61 projecting through the filler body is designed, at least at its lower end, as a threaded rod. In this case, a hook element 63 is held by a nut 62, which hook element surrounds the rod 57 of the lower grate. The nut 62 should be secured against loss by one of the customary safeguards.

Figure 13:
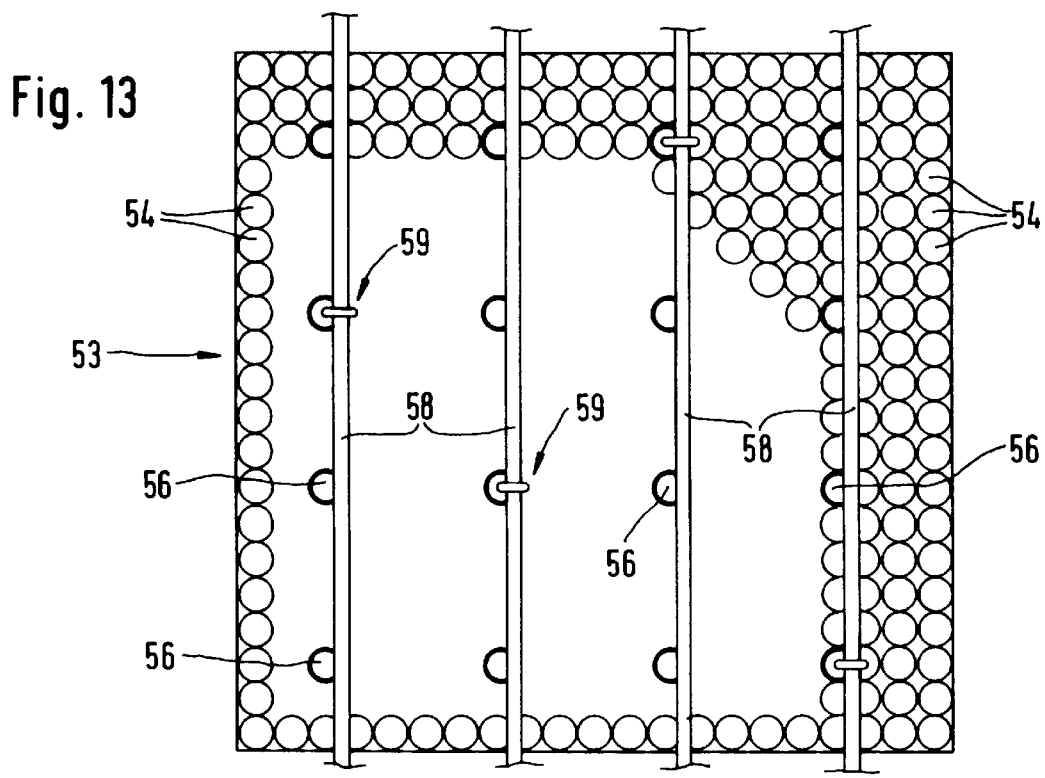
FIG. 13 shows the buoyancy safeguard according to FIG. 12 in a diagrammatic plan view.

For reasons of stability, it may also be expedient to provide an upper layer of bearing blocks 53. If the weight of the latter is not sufficient alone as a buoyancy safeguard, the upper and the lower layer of bearing blocks 53 can also be connected to one another by the toggle 59. This case is illustrated diagrammatically in FIG. 13. In this case, it is sufficient if each rod 58 is secured solely by one toggle 59 in the region of a bearing block 53.

The rods 58 extend in a similar manner to the rods 57 in the region of the loose tubes 56. As a result, at the same time, the loose tubes 56 are in turn secured against floating up by means of the rods 58. However, in this case too, the loose tubes 56 can also be firmly connected, e.g. by welding, to the tubes 54 of the bearing block 53.

Figure 14:
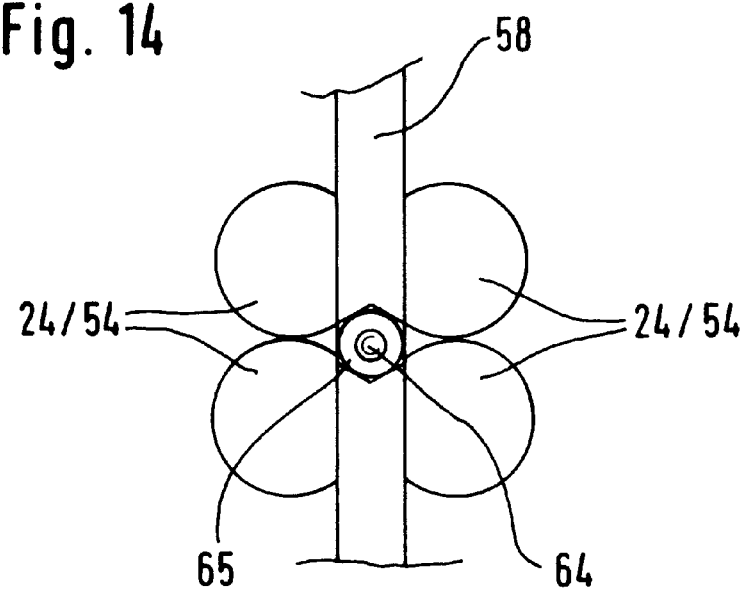
FIG. 14 shows a second embodiment of a buoyancy safeguard similar to that of FIG. 12.
Figure 15:
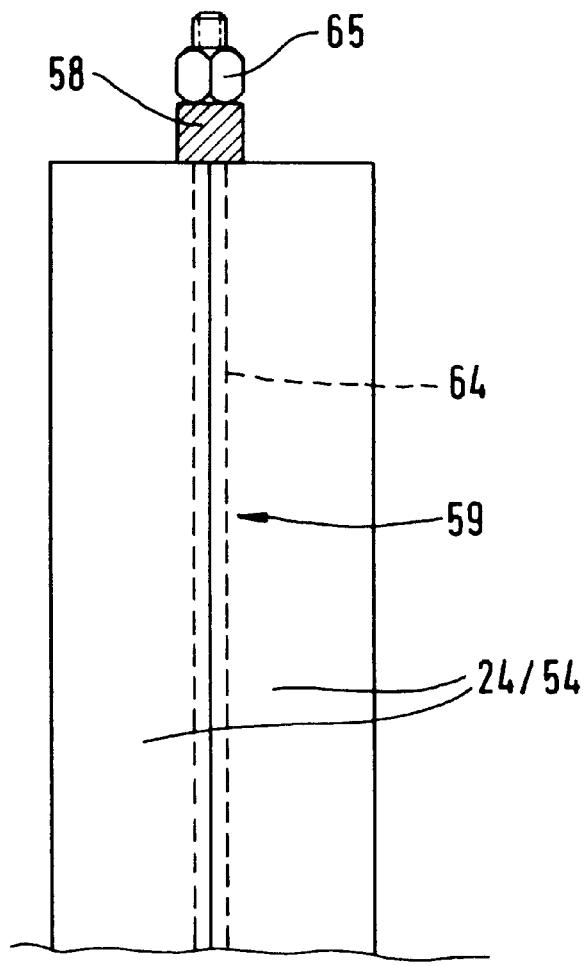
FIG. 15 shows the buoyancy safeguard according to FIG. 14 in a diagrammatic side view.

An alternative embodiment of a toggle 59 is shown in greater detail in FIGS. 14 and 15. In this case, the said toggle is designed as a threaded rod 64 and extends in the region between the tubes 24 of the filler-body blocks 40 and the tubes 54 of the bearing blocks 53. At its upper end, the threaded rod 54 is passed through a bore (not illustrated) through the rod 58 and is screwed by a nut 65. At its lower end, the threaded rod 64 is expediently likewise passed through a bore in the rod 57 of the lower grate and is connected to the said rod by a nut. The nuts 65 should, in this case too, be secured against loss by the customary safeguards. The length of the threaded rod 54 is again dimensioned such that different thermal expansions are compensated.

The filler-body blocks 21, 22, 23, 36, 40, 45 and bearing blocks 53 are manufactured from the tubes 24 and 54 by welding the latter together at their end faces. The gaps 25, 26, 41, 46, 55 are subseqently formed by separating the welds and removing the tubes which are thus released. These tubes can be used as loose tubes 31, 38.

Filler bodies for other applications, in particular the treatment of gases and the cooling of liquids, can be designed in the same manner.

I claim:

1. A Filler body, for the biological treatment of liquids comprising:
    at least two filler-body blocks releaseably connected to each other, with a filler-body block having a plurality of tubes firmly connected to one another, said plurality of tubes having an outer surface structured in a net-like manner, with said filler-body block having a plurality of gaps that are formed by at least partially missing tubes in the filler-body blocks and with a plurality of loose connecting tubes which are arranged in said plurality gaps and which extend over a plurality of filler-body blocks, with said plurality of loose connecting tubes having a cross-section corresponding to a cross-section of the tubes of the filler-body blocks.

2. Filler body according to claim 1, characterized in that the loose connecting tubes are designed to be loose.

3. Filler body according to claim 1, characterized in that the tubes and the loose connecting tubes have the same dimensions.

4. Filler body according to claim 1, characterized in that the filler-body blocks (22, 36) have gaps (25) continuing over their height.

5. Filler body according to claim 1, characterized in that the filler-body blocks (21, 23) have gaps (26) which extend over a part of the height of the filler-body block (21, 23).

6. Filler body according to claim 1, characterized in that said loose connecting tubes of different length dimensions project into the gaps.

7. Filler body according to claim 1, characterized in that each filler-body block (40, 45) has at least two gaps (41, 46) in at least two rows (42) and columns (43) of tubes (24), the distance between two gaps (41, 46) being exactly twice the distance of the gaps (41, 46) from edges (44) of the filler-body block (40, 45).

8. Filler body according to claim 7, characterized in that each filler-body block has four gaps (41, 46).

9. Filler body according to claim 7, characterized in that the filler-body blocks (40, 45) of one layer (48, 49, 50, 51) are arranged offset by half a filler-body width or length relative to the filler-body blocks (40, 45) of a layer (48 . . . 51) located above and/or below it.

10. Filler body according to claim 9, characterized in that the filler-body blocks (40, 45) of one of the layers (48 . . .

51) are arranged offset in two horizontal directions disposed perpendicular to one another relative to the filler-body blocks (40, 45) of a layer (48 . . . 51) located above and/or below it.

11. Filler body according to claim 1, characterized in that the filler-body blocks (21, 22, 23, 36, 40, 45) of the lowest layer rest on a lower layer of bearing blocks (53), the said bearing blocks (53) being designed in terms of their dimensions in a horizontal plane to be larger than the filler-body blocks (21, 22, 23, 36, 40, 45).

12. Filler body according to claim 11, characterized in that bearing blocks rest on a grate of rods which are arranged parallel to one another and each extend in the region of loose connecting tubes.

13. Filler body according to claim 1, characterized in that the filler-body blocks (21, 22, 23, 36, 40, 45) are secured against buoyancy.

14. Filler body according to claim 13, characterized in that the filler-body blocks (21, 22, 23, 36, 40, 45) are secured by an upper grate of rods (58) extending parallel to one another, the said rods (58) of the upper grate being connected by a toggle (59) to the rods (57) of the lower grate.

15. Filler body according to claim 14, characterized in that an upper layer of bearing blocks (53) is provided for the buoyancy safeguard, which bearing blocks, due to their own weight, prevent the filler-body blocks (21, 22, 23, 36, 40, 45) from floating up.

16. Filler body according to claim 13, characterized in that an upper layer of bearing blocks (53) is provided, which is secured by an upper grate of rods (58) against floating up, the said rods (58) of the upper grate being connected by the toggle (59) to the rods (57) of the lower grate.

* * * * *